Nov. 26, 1940.  R. U. CLARK  2,222,832
SLIDE FASTENER ATTACHMENT
Filed Dec. 10, 1938
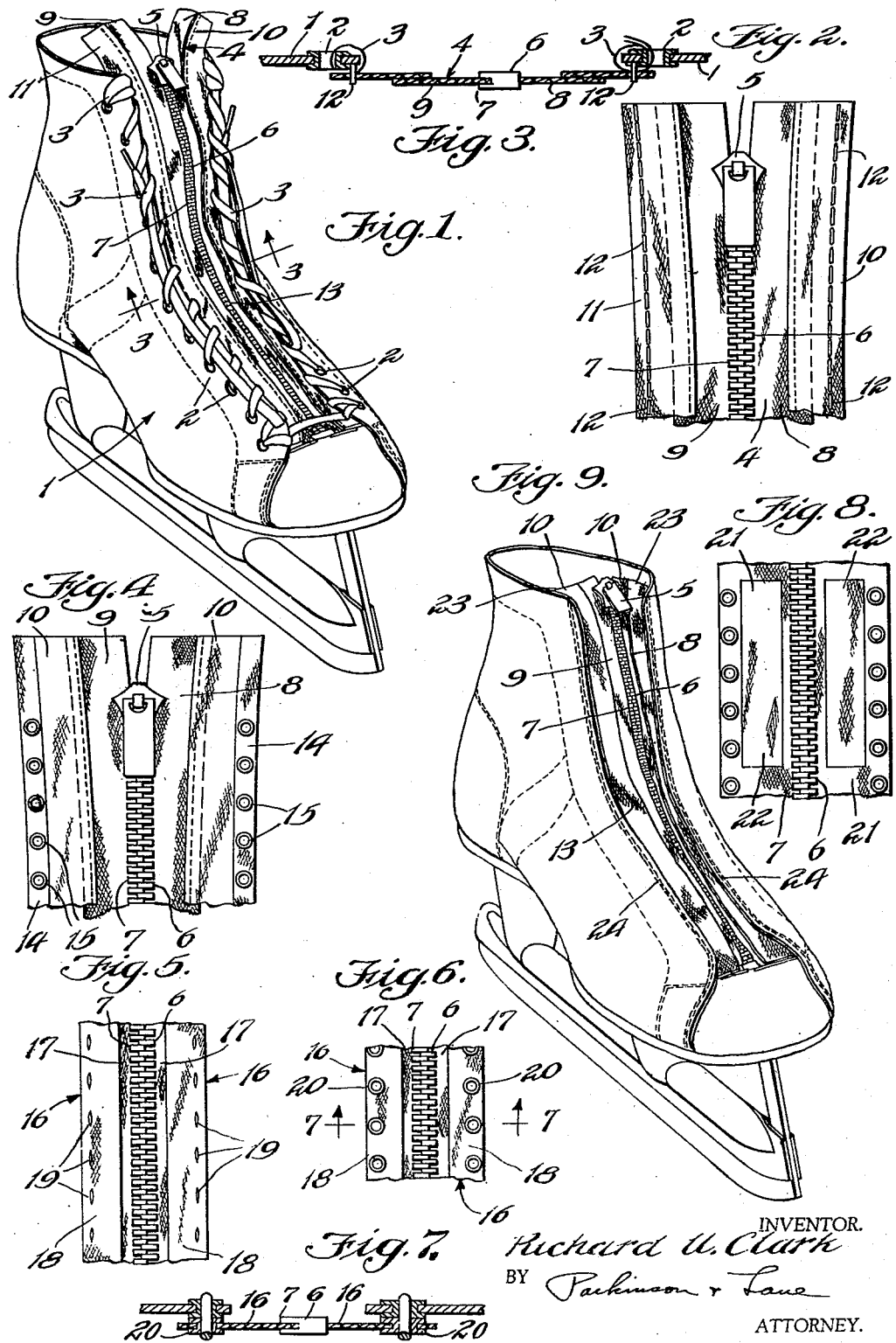
INVENTOR.
Richard U. Clark
BY Parkinson + Lane
ATTORNEY.

Patented Nov. 26, 1940

2,222,832

UNITED STATES PATENT OFFICE 2,222,832

SLIDE FASTENER ATTACHMENT

Richard U. Clark, Fort Wayne, Ind.

Application December 10, 1938, Serial No. 244,887

2 Claims. (Cl. 36—51)

The present invention relates to slide fastener attachments for foot wear where tight grip fitting is necessary, such as skating shoes.

In skating shoes it is necessary to have a tight grip in all parts of the shoe, thus the slide of the fastener encounters a great amount of strain, particularly at the bend of the instep at which point it is very essential that the grip of the shoe be tight to properly brace the ankle. When slide fasteners were first attempted on such shoes, the fit was maintained rather loosely in order that the slide could be moved, for if laced to give a sufficiently tight grip as is necessary in a skating shoe, the slide would jam, particularly at the instep, resulting in great annoyance to the user and breakage of the fastener.

From the above, it is apparent that it is necessary, in order to secure a satisfactory device, to provide an attaching means which has a certain amount of resiliency, but will not yield or give after the fastener has been closed. I have discovered that by using a tape which is resilient in a direction parallel to the path of the fastener but not substantially resilient at approximately a right angle to the fastener after the fastener is closed, will give the desired results. It is quite difficult to explain the reason for this, as it would seem to be exactly opposite to the expected effect resulting from such construction. I have found, however, that by attaching the fastener to a tape having a yielding but non-resilient portion next to the fastener and a portion which is resilient in the direction of the path of the fastener but non-resilient at substantially a right angle to the fastener, I have developed a device which will not jam or bind at the point of stress or strain and which will preserve a snug, substantially unyielding grip on the article to which it is attached after the fastener is closed.

When applied to a skating shoe, no difficulty has been found in opening or closing the fastener and there is maintained a snug fit on the instep after the fastener has been closed without any tendency to constantly stretch this resilient portion and cause it to become loose and sag as when the resilient portion was at an angle to the path of the fastener.

While I have shown and described a fastener for a skating shoe, it is readily apparent that my device can be applied to any other article where there is strain or stress on one portion resulting in binding and jamming of the fastener when being closed and unclosed.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangements of parts illustrated in the accompanying drawing, and while I have shown therein a preferred embodiment, it is to be understood that the same is susceptible of modification and change, and comprehends other details, arrangements of parts, features and constructions without departing from the spirit of the invention.

In the drawing:

Fig. 1 is a perspective view of a skating shoe to which my novel fastener attachment has been applied;

Fig. 2 is an enlarged fragmentary front view of the fastener attachment shown in Fig. 1;

Fig. 3 is a vertical sectional view taken on the line 3—3 of Fig. 1;

Fig. 4 is a view similar to Fig. 2 of another form of fastener;

Fig. 5 is a similar view of still another form;

Fig. 6 is a similar view of still another form;

Fig. 7 is a sectional view taken on the line 7—7 of Fig. 6;

Fig. 8 is a front view of another form of attachment;

Fig. 9 is a perspective view of a skating shoe in which my novel fastener attachment has been sewn.

Referring to the embodiments shown in Figs. 1 and 3, my invention is shown as applied to a skating shoe 1 having the usual eyes 2 in each set of which are laces 3. To this shoe is attached by means of the laces 3, the novel fastener attachment shown generally at 4, which comprises fastener or slide 5 operatively connected to fastening elements 6 and 7 adapted to be opened and closed in the manner well known to the art. These elements are secured in the usual manner as by sewing, to flexible, substantially non-resilient strips 8 and 9, which are preferably of strong fabric such as canvas or the like. To the outer edges of these strips 8 and 9 are secured tapes 10 and 11 of resilient material, such as elastic, which are resilient or stretchable longitudinally, or in a direction substantially parallel to the path of the fastener or slide 5 in the fastening elements 6 and 7. Such tapes are well known in the art, the desired result being accomplished in various ways as by using elastic material in the warp or longitudinal threads, and non-elastic material in the woof or lateral threads. Garters, suspenders and numerous other garments and materials have been made in this manner for many years. Near the outer edge of these tapes 10 and 11 is sewn a strong thread forming loops 12 adapted to receive each of the laces 3. The user will lace the laces 3 through the eyelets 2 of the shoe and the loops 12 of the attachment for securing the attachment to the shoe. After the shoe has thus been laced to conform to the foot and leg of the wearer, the laces are permanently tied and the shoe is opened and closed by movement of the slide 5 up and down the fastener elements 6 and 7. Experience has shown that with prior art constructions, the slide will bind and jam at points of strain along the sliding elements such as at the instep, shown generally at 13. However, my flexible tapes 10 will take up all stress or strain at this point when the slide is either opening or closing the fastener elements, but after the elements are closed, will maintain a snug fit on the foot of the user at all points and will not yield at the instep or other points of strain.

In Fig. 4 is shown an alternate construction in which a strip 14 of strong fabric is sewn or otherwise attached to the outer edge of flexible strips 10 and in which are suitably attached eyelets 15 for attachment to the laces 3, the eyelets taking the place of the loops 12 of Figs. 1 to 3.

In Fig. 5 the fastener elements 6 and 7 are suitably attached to composite attaching means or tapes 16. These tapes comprise an inner edge portion 17 of strong fabric such as canvas or the like to which the fastening elements 6 and 7 are sewn or otherwise attached. Integrally woven with the fabric 17 are portions 18 of a flexible and resilient material, the material being resilient only in a longitudinal direction similar to the tape 10 of the first four figures. This material 18 is loosely woven and near its outer edges is so loosely woven as to provide openings 19 for receiving the laces 3 for attachment to the shoe.

In Figs. 6 and 7 are shown still another construction in which a composite tape similar to that shown in Fig. 5 is disclosed. However, in this construction are provided eyelets 20 for receiving the laces in place of the enlarged openings 19 of Fig. 5. In Fig. 8 is shown another alternate construction of a composite tape 21 attached to fastener elements 6 and 7, this composite tape having an elastic portion 22 similar to the elastic strips shown in the preceding figures, the strips being located only near the point of stress or strain such as the instep rather than running the entire length of the fastener attachment.

In Fig. 9 is shown a still further alternate construction in which an attachment such as that shown in any of the preceding figures is sewn into the shoe rather than being laced thereto. In the construction shown there are the fastener elements 6 and 7 and slide or fastener 5 attached to flexible strips 8 and 9 of canvas or other strong fabric. Attached to these strips, either by sewing or the like, are resilient strips 10 similar to the resilient strips of the other figures, on the outside edge of which are sewn or otherwise secured to narrow bands of canvas or other strong fabric 23 sewn to the shoe as shown at 24. Any of the composite or other attachments shown in the preceding figures, however, may be sewn into the shoe if desired.

Having disclosed the invention, I claim:

1. A slide fastener unit for securing together adjacent parts of an article comprising strips of longitudinally substantially inextensible material to which the slide elements are attached, and tapes resilient only in a direction substantially parallel to the path of the fastener attached to said strips.

2. A shoe provided with a slide fastener at the instep portion thereof, longitudinally non-extensible strips carrying the elements of said slide fastener, and tapes between said strips and the shoe extensible only in a longitudinal direction.

RICHARD U. CLARK.